(12) United States Patent
Burkart

(10) Patent No.: US 6,439,903 B1
(45) Date of Patent: Aug. 27, 2002

(54) RECEPTACLE FOR DATA CARDS

(75) Inventor: Harald Burkart, Villingen-Schwenningen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/983,008

(22) Filed: Oct. 18, 2001

(30) Foreign Application Priority Data

Nov. 2, 2000 (DE) .......................................... 200 18 694

(51) Int. Cl.[7] .............................................. H01R 13/62
(52) U.S. Cl. ...................................... 439/159; 439/630
(58) Field of Search ................................ 439/260, 259, 439/261, 267, 630, 159, 160

(56) References Cited

U.S. PATENT DOCUMENTS

| | | | | |
|---|---|---|---|---|
| 4,932,889 A | * | 6/1990 | Bleier et al. ................ | 439/260 |
| 5,536,180 A | * | 7/1996 | Ishida et al. ................ | 439/159 |
| 5,573,413 A | * | 11/1996 | David et al. ................ | 439/159 |
| 5,643,001 A | * | 7/1997 | Kaufman et al. ........... | 439/159 |
| 5,899,763 A | * | 5/1999 | Kajiura ....................... | 439/159 |
| 6,017,230 A | * | 1/2000 | Yao ............................. | 439/159 |
| 6,045,377 A | * | 4/2000 | Kajiura ....................... | 439/159 |
| 6,065,984 A | * | 5/2000 | Tung ........................... | 439/159 |
| 6,089,890 A | * | 7/2000 | Oguchi et al. .............. | 439/159 |
| 6,089,891 A | * | 7/2000 | Nishioka .................... | 439/159 |
| 6,113,403 A | * | 9/2000 | Oguchi ........................ | 439/159 |
| 6,155,852 A | * | 12/2000 | Ozawa et al. ............... | 439/159 |
| 6,155,853 A | * | 12/2000 | Kajiura ....................... | 439/159 |

* cited by examiner

Primary Examiner—Tho D. Ta
Assistant Examiner—Phuong Chi Nguyen
(74) Attorney, Agent, or Firm—Martin A. Farber

(57) ABSTRACT

A receptacle including a cardholder (20) with a control slide (21) which is mounted thereon and which can be displaced counter to a tension spring (28) by a data card. The control slide (21) is assigned a locking latch (22) which is released from the outside in order to output a data card. A closing element (23), which has an operative connection to the control slide (21), has bolts (62, 63) which engage in the plane of movement of the data cards and to which a retaining spring (83) is assigned. When a data card is input, the closing element (23) can be pivoted while interacting with oblique faces formed on the bolts (62, 63). If a data card is located in the read/write position, the closing element (23) which is in engagement with a connecting part (24) formed in the control slide (21) is locked.

15 Claims, 4 Drawing Sheets

RECEPTACLE FOR DATA CARDS

FIELD AND BACKGROUND OF THE INVENTION

The invention relates to a receptacle for data cards having a cardholder in which the data cards are guided and having locking means which are assigned to the cardholder and which can be activated by means of a data card when the data card is inserted into the receptacle, and having ejection means which can move a data card located in the read/write position into a removal position.

The use for data cards for registering the individual working times and rest times of the drivers of utility vehicles requires, owing to the documentary value of these recordings, reliable ways of protecting them in order to avoid the data transmission between a data registering unit and a data card being disrupted for fraudulent purposes. However, the spatial possibilities, in particular as far as the constructional depth in the area which is in the reach of drivers is concerned, are severely restricted in a utility vehicle so that it is not possible to implement a relatively large conveying path, or if appropriate a change in direction, while a data card is being conveyed as a security measure, either in a tachograph which contains an appropriate receptacle for data cards or in an embodiment as an autonomous data card assembly. An additional aggravating factor for the development of a suitable receptacle for the data cards is that the environment in which they are used is subject to considerable climatic fluctuations and functional faults may occur owing to changes in materials caused by temperature and moisture. On the other hand, for an application in utility vehicles it is necessary to fulfil the conditions of large-scale production, namely a method for mounting components which are as simple as possible and which can be manufactured at comparatively low cost which is compatible with series production.

SUMMARY OF THE INVENTION

While taking into account the series production-compatibility mentioned above, the objective arises of providing a receptacle for data cards which is sufficiently robust for use in utility vehicles, functions reliably under the conditions prevailing at the place of use and is tamper-proof.

The means of achieving the object set are characterized in that the cardholder and a control slide mounted thereon are embodied in such a way that the control slide can be displaced relative to the cardholder, counter to the effect of a tension spring by means of an insertable data card, in that a locking latch which is assigned to the control slide is mounted in a sprung fashion on the cardholder and embodied in such a way that it can be activated with the effect of unlocking the control slide, in that a closing element which can be pivoted about an axis arranged transversely with respect to the direction of movement of the data cards is provided, which closing element, on the one hand, interacts with a connecting part which is formed in the control slide and, on the other hand, has at least one bolt which engages in the plane of movement of the data cards, in that a retaining spring which acts with the effect of closing the cardholder is assigned to the closing element, in that, when a data card is input, the closing element can be pivoted counter to the effect of the retaining spring by means of the data card, and in that the connecting part of the control slide is embodied in such a way that the closing element is locked if there is a data card in the cardholder.

A preferred embodiment of the invention provides that the cardholder is manufactured from sheet metal as a punched and bent part, and in that the cardholder is constructed in one piece, ridges being formed on a flat base element in parallel in such a way that guide grooves corresponding to the data cards are formed between the base element and the ridges.

In the preferred embodiment, the closing element is advantageously embodied as a bridge which is mounted on two sides in the cardholder and on which a retaining spring embodied as a leaf spring is arranged.

Further expedient refinements of the invention are described by the subclaims, which are not cited above.

The decisive advantage of the solution found is that the receptacle is composed of a very small number of easy-to-mount components of robust construction, the structural concept providing for at least the load-bearing cardholder to be manufactured as a punched and bent part from sheet metal, for example from a corrosion-resistant material which permits manufacture in high numbers and satisfactory reproducibility accompanied by comparatively low manufacturing costs. Furthermore, the structural concept also permits a large degree of freedom from maintenance and functional reliability even when simple and cost-effective lubricants are used, and specifically even under the rough operating conditions prevailing in a utility vehicle. In addition, a minimum of overall height can be achieved, in which case, if appropriate, necessary reinforcement can be formed by means of beading which can be easily attached.

Because there is provision to insert the data cards into the receptacle as far as the read/write position exclusively by hand, there is, on the one hand, independence from the surface and the bends in a data card, and on the other hand the data cards can be output with relatively large force, the retaining spring which is supported on the data card to be output performing a braking function. It is also worth noting in this context that the retaining spring is more greatly stressed, and thus exerts a greater closing force, if there is a data card in the cardholder than if there is no data card in the cardholder. That is to say that the pivoting of the closing element when a data card is inserted is made easier. Locking the receptacle by means of the connecting part which is suitably formed in the control slide and guides the closing element is also advantageous because it is achieved with simple means. In the locked state of the closing element, a data card which is located in the receptacle can no longer be displaced so that tampering by interrupting the contacts with a data card is prevented.

The dimensionally stable construction of the receptacle also provides the advantage that given a direct assignment of the receptacle to a printed circuit board, not only do deformations of the printed circuit board due to temperature and moisture remain without effect but also a screening effect is provided as a result of the material selected for the receptacle. In addition, with the design which has been arrived at, there is a relatively large amount of equipping space remaining on the side of the printed circuit board which faces the receptacle and on which the set of contacts for making contact with the data cards is also located. Furthermore, the proposed solution provides the conditions for emergency unlocking which can be implemented in an extremely simple way, and all that is necessary is to provide a lead-sealed opening in a front cover of the receptacle, through which opening the locking latch of the control slide can be activated by means of a "tool".

Further advantages of the invention are apparent from the following description of the preferred exemplary embodiment.

BRIEF DESCRIPTION OF THE DRAWINGS

In the drawings relating to the preferred exemplary embodiment.

DETAILED DESCRIPTION OF THE PREFERRED EMBODIMENT

Figure 1:
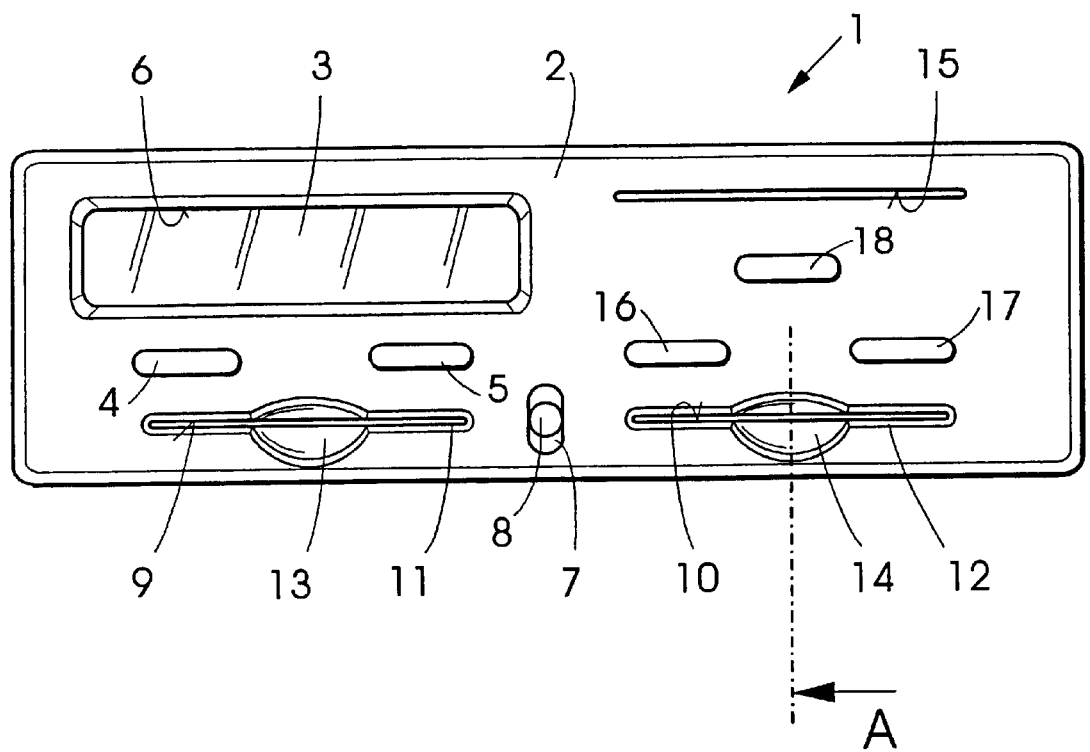
FIG. 1 shows a front view of a tachograph in which the receptacle according to the invention is installed.

The tachograph 1 illustrated in FIG. 1 has a front panel 2 which is connected to a parallelepiped-shaped installation housing and in which a display 3 is secured, and pushbutton keys 4 and 5 are arranged. 6 designates a window cutout assigned to the display 3; a cover 7, to which a lead seal 8 is assigned, closes off a plug mount provided for diagnostic and parameterization purposes. 9 and 10 designate slots which permit access to the receptacles and which are provided for personal data cards assigned to drivers I and II. The slots 9 and 10 are provided, for the sake of easier insertion of data cards, with funnel-shaped depressions 11 and 12 and with centrally formed finger grips 13 and 14 in such a way that the data cards can be inserted as far as the respective read/write position. A slot which is designated by 15 is provided for the print carrier of a printed record printer arranged in the tachograph 1 to pass through. Further pushbutton keys 16, 17 and 18 of the tachograph 1 which are guided in the front panel 2 and/or engage through the front wall are used, in combination with the pushbutton keys 4 and 5, to select the most important working time data of the drivers, to bring about forward and backward scrolling in the data records of a selected type of data, to initiate printing and to release the data cards.

Figure 2:
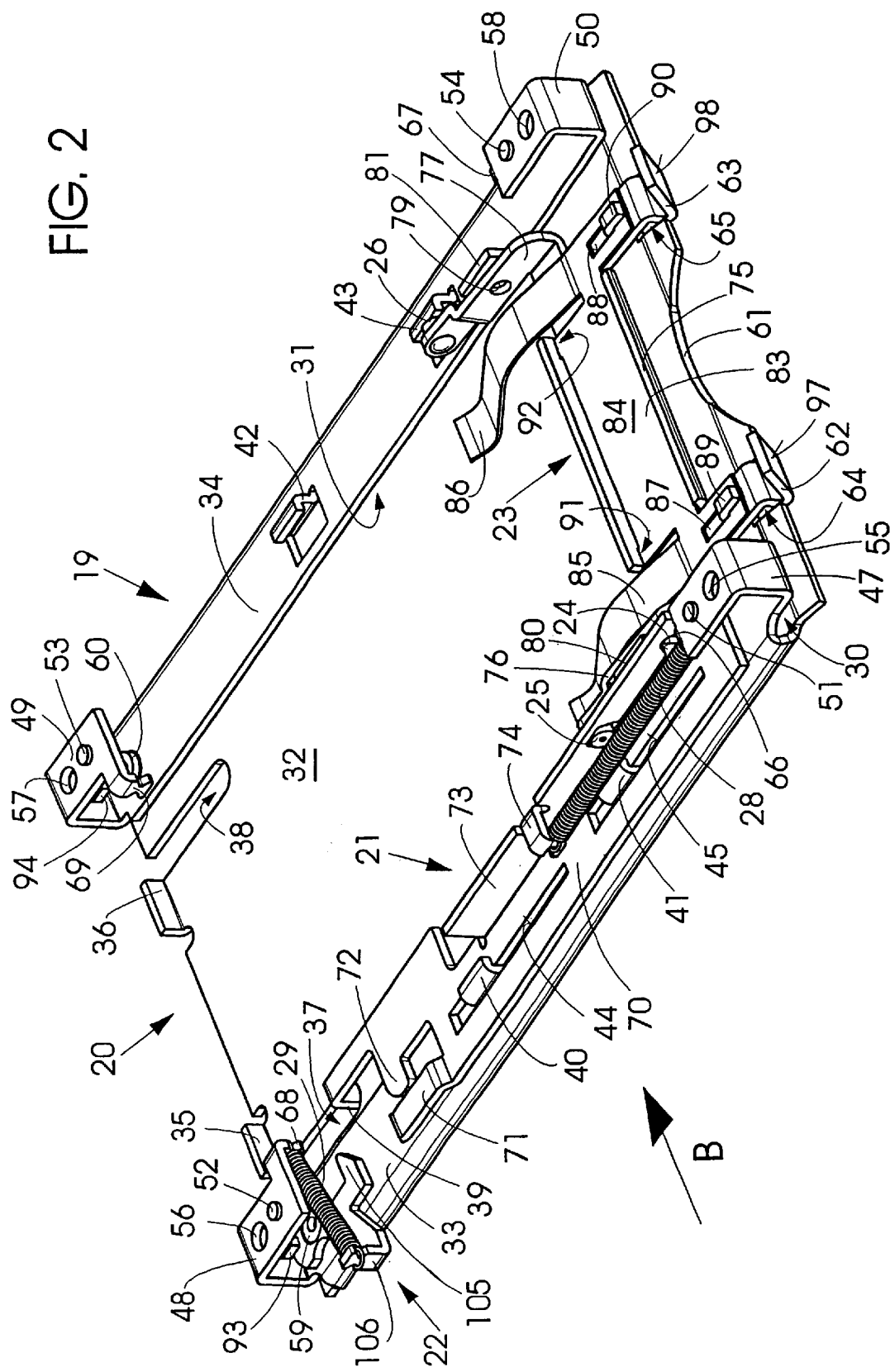
FIG. 2 shows a perspective view of the receptacle.

The receptacle 19 illustrated in FIG. 2 consists essentially of a cardholder 20 which forms a pocket for the data cards, a control slide 21 which is displaceably mounted on the cardholder 20, a locking latch 22 which is assigned to the control slide 21 and a closing element 23 which is rotatably mounted on the cardholder 20 and which has an operative connection to the control slide 21 by means of pins 25 or 26 via a connecting part 24 formed in the control slide 21. The receptacle 19 is, for the rest, configured in such a way that if two receptacles 19 are arranged one next to the other, as illustrated in FIG. 1, the control slides 21 and the locking latches 22 can be attached to the receptacle devices 19 on alternate sides in order to be able to arrange a release element which is, for example, motor-operated (not illustrated because it is not essential to the invention) and which, when a data card is released, pivots the locking latch 22 by interacting with a finger 27 (FIGS. 2 and 5) formed on the locking latch 22, in a fashion which serves the purpose, that is to say takes up as little space as possible in the tachograph 1. At this point it is also to be noted that the structural concept provided makes it easily possible to equip the receptacle 19 on both sides with ejection means, specifically with two control slides 21, tension springs 28 assigned thereto, two locking latches 22 and restoring springs 29 engaging thereon, the locking latches 22 having to be mechanically coupled to one another in order to permit the control slides 21 to be unlocked simultaneously. This ensures that even bent or curved data cards which cause increased friction in the guide grooves 30 and 31 of the cardholder 20 can be pushed forward into the release position without tilting.

In particular, FIG. 2 shows that the cardholder 20 which is embodied in one piece as a punched and bent part has a reinforcing base element 32 which is provided, if appropriate with beading and on which ridges 33 and 34 are provided parallel to one another in such a way that the guide grooves 30, 31 which correspond essentially to the thickness of the data cards are formed between the ridges 33, 34 and the base element 32 and at the same time also serve to guide the data card laterally, specifically with little play. Tabs 35 and 36 are bent up from the base element 32 as end stops for the data cards which are to be pushed forward manually into the write/read position in the proposed receptacle 19. Slots 37 and 38 provided in the base element 32 are for drivers 39 formed on the control slides 21 to engage through. Tongues which extend from the ridges 33, 34 and are provided for guiding and securing the control slides 21 on the cardholder 20 are designated by 40 and 41, and 42 and 43, respectively. In this respect, keyhole-like guide slots 44 and 45 are formed in a control slide 21. Platforms 47, 48, 49 and 50 which are formed on the ridges 33, 34 and thus on the cardholder 20 and on which in each case centering pins 51, 52, 53 and 54 and threaded holes 55, 56, 57 and 58 are formed have the purpose of attaching the cardholder 20 to a printed circuit board 46 (FIG. 4) of the tachograph 1. In this context it is to be noted that in order to simplify the manufacture, it is possible merely to form supporting limbs, instead of platforms 47, 48, 49, 50, at right angles on the ridges 33, 34, said supporting limbs having lugs formed on them in order to form lacing connections to the printed circuit 46. Two bushings 59 to 60, which extend from the ridges 33, 34, serve as bearing axles for the locking latches 22. As is also apparent from FIG. 2, the base element 32 which is bent at the front has a centrally provided recess 61 and cutouts 64 and 65 which are assigned to the bolts or bars 62 and 63 formed on the closing element 23. In addition, it is to be noted that hooks 66, 67, 68 and 69, on the one hand for the tension springs 28 to engage in, and on the other hand for the restoring springs 29 to engage in are also formed directly on the cardholder 20 which is preferably manufactured by means of a series connection tool. Apart from the driver 39, a retainer 71, which interacts with the locking latch 22, and a latching tooth 72 are formed on the one limb 70 of the control slide 21 which has an at least partially angled profile and is also manufactured from sheet metal as a punched and bent part and, as already mentioned, is displaceably guided on the cardholder 20. On the other limb 73, a hook 74 attached to the tension spring 28 is formed and the connecting part 24 controlling the closing element 23 is cut out.

The closing element 23 is also manufactured by punching and bending techniques. The bolts 62, 63 already mentioned are formed on a bridge 75 which is constructed as a U profile and provided with bearing arms 76 and 77. At the latter, on the one hand the pins 25, 26 which engage in the connecting parts 24 of the control slides 21 and on the other hand the bearing journals 78 (FIG. 3) and 79 of the closing element 23 are pressed out. 80 and 81 designate bearing holes which are formed on the ridges 33, 34 and assigned to the bearing journals 78, 79 of the closing element 23 and are provided with arrows. One of the bearing holes is designated by 82 in FIG. 3. So that the closing element 23 can carry out its function, a retaining spring 83 which is directly connected to the closing element 23 and embodied as a leaf spring is provided. Said retaining spring 83 is formed essentially by a supporting element 84 which fits into the U profile of the bridge 75 of the closing element 23 and by pressing-on limbs 85 and 86 formed on said supporting element 84. The retaining spring 83 is attached to the closing element 23 in a positively locking fashion such that on the one hand eyelets 87 and 88 are formed in the retaining spring 83 and hooks 89 and 90 which are bent out of the closing element 23 are assigned to said eyelets 87 and 88, while on the other hand slots are formed in the limb (not designated in more detail) of the bridge 75 and tongues assigned to the slots are formed on the supporting element 84 of the retaining spring 83. The tongue-slot connections are designated by 91 and 92 in FIG. 2.

Figure 3:
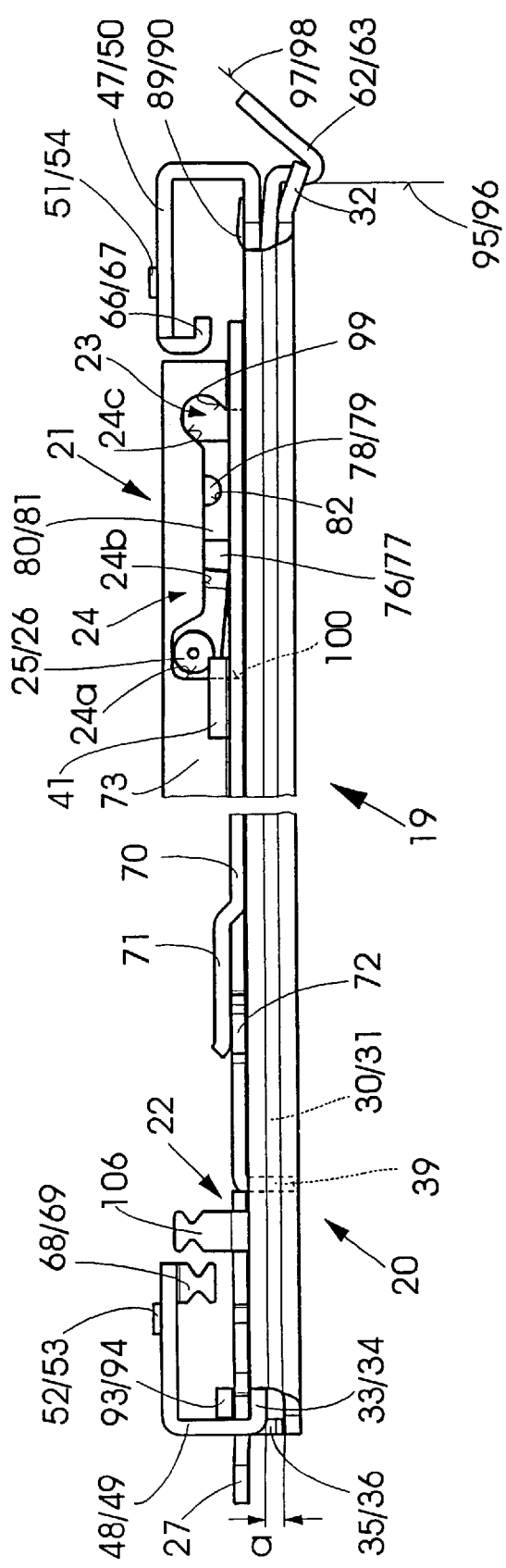
FIG. 3 shows a side view of the receptacle viewed in the direction B in FIG. 2, a central region being recessed and the tension springs being committed from the illustration for the sake of clarity.

As can be additionally inferred from FIG. 2, and in particular from FIG. 3, a stop 93 or 94 which is effective in the axial direction and is formed by punching and bending techniques is assigned to the locking latch 22, said stop being supplemented in its effect, when the locking latch 22 is pivoted by means of the latching tooth 72 formed on the control slide 21, by the retainer 71 which lies over the locking latch 22 in this functional state. 95 and 96 designate areas which are formed on the rear of the bolts 62, 63 and are essentially at right angles to the plane of movement of the data cards in the mounted state of the closing element 23, that is to say they are dipped into the plane of movement of the data cards under the action of the retaining spring 83 and form a locking plane. In contrast, front areas 97 and 98 of the bolts 62, 63, which are inclined with respect to the plane of movement of the data cards, form an oblique plane which facilitates the pivoting of the closing element 23 when the data cards are inserted.

The dimension "a" given in FIG. 3 is used to label the height of the guide grooves 30, 31 provided between the base element 32 and the ridges 33, 34. In FIG. 3, the section of the connecting part 24 which permits the closing element 23 to pivot out of the illustrated closed position is designated by 24a. The section of the connecting part 24 which causes the bolts 62, 63 to be raised during the insertion or outputting of a data card in order to unlock the cardholder 20 is designated by 24b. The section 24c prevents a rotary movement of the closing element 23 out of the closed position when the control slide 21 is arrested by means of the locking latch 22, owing to the connecting part boundary 99 which runs obliquely with respect to the direction of movement of the control slide 21. In other words, the bolts 62, 63 are prevented from being raised from the outside.

For the sake of completeness it is to be noted that the limb 70 of the control slide 21 has suitable cutouts to enable the connecting part 24 to move and to form the connecting part 24 with a very low overall height. The cutout illustrated by dotted lines in FIG. 3 is designated by 100.

Figure 4:
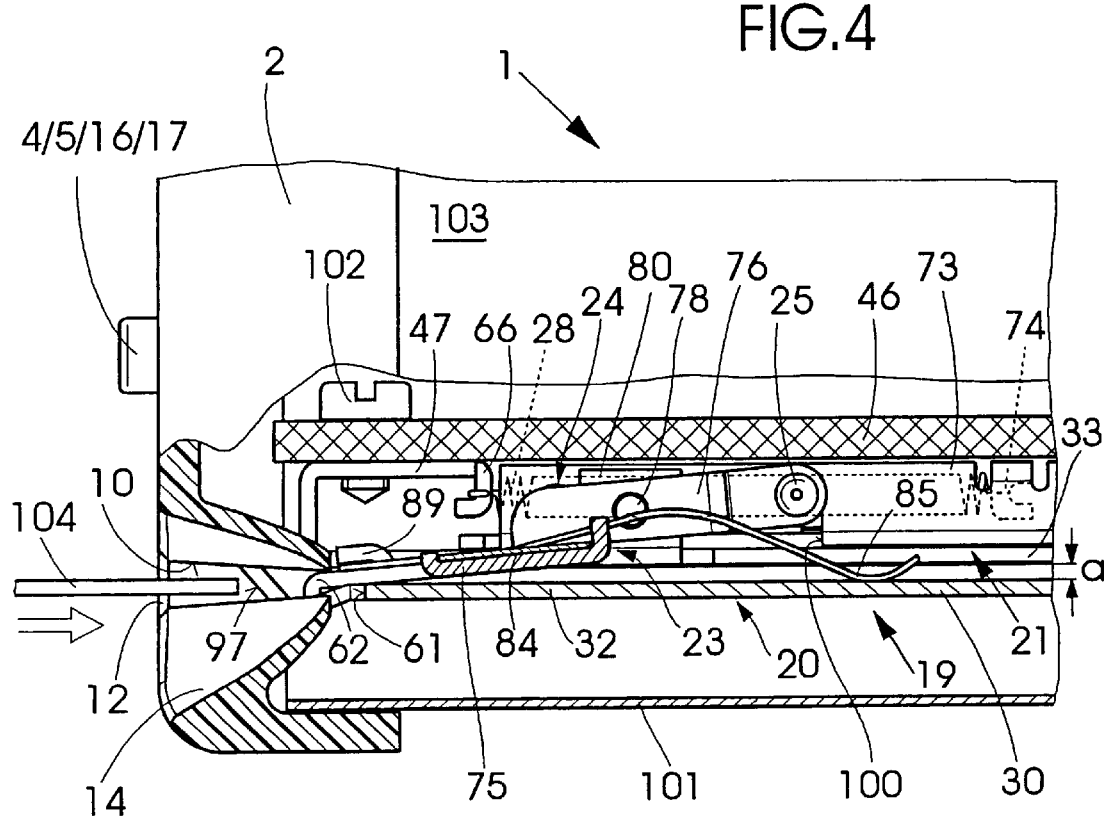
FIG. 4 shows a partial sectional view of a front panel, of a printed circuit board and of the receptacle in an assignment provided in the tachograph according to FIG. 1.

FIG. 4 which shows the assignment of the receptacle 19 according to the invention to the front panel 2 and to the printed circuit board 46 of the tachograph 1 illustrates the relatively small overall height requirement of the receptacle 19. That is to say, in the specific case of the tachograph 1, there is an overall height of a maximum 10 mm available between the printed circuit board 46 and a base part 101. The receptacle 19 which is attached to the printed circuit board 46 by means of screws, of which one is designated by 102, permits, with an overall height of approximately 7.5 mm, a relatively thin and large-area base part 101 to yield when the tachograph 1 is handled, for example when it is installed in a vehicle, without affecting the receptacle 19, and via the latter the printed circuit board 46 which is sensitive to bending. The side wall of the tachograph 1 is designated by 103 and 104 is a data card which is to be inserted.

Figure 5:
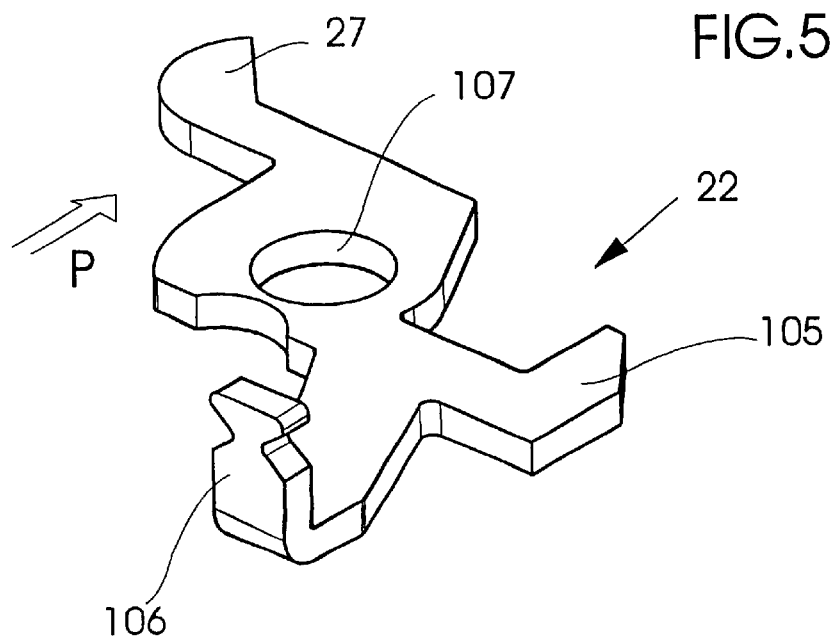
FIG. 5 is a perspective view of the locking latch.

The locking latch 22 which can be seen only partially in the figures already described interacts with the control slide 21 is shown in FIG. 5. The locking latch 22 constitutes essentially a two-armed lever, one arm of which is formed by the finger 27 which is actuated in order to release or reject a data card in the direction of the arrow P. The other arm is provided with a latch tip 105 which interacts with the latching tooth 72 formed on the control slide 21. A raised hook 106 is used to engage one end of the restoring spring 29; a bearing hole, corresponding to the bushings 59, 60, on the locking latch 22 is designated by 107.

The sequence when a data card 104 is inserted and output will be summarized once more below. When a data card 104 is inserted, it is initially pre-aligned in one of the slots 9 or 10 in the front panel 2, strikes against the areas 97, 98 formed on the bolts 62, 63 and pivots, owing to the given arrangement of the closing element 23 in the manner of a wedge mechanism, the pressing-on limbs 85, 86 of the retaining spring 83 experiencing additional prestress. The data card 104 is subsequently oriented and retained by the guide grooves 30, 31 and the pressing-on limbs 85, 86 of the retaining spring 83. As the data card 104 is inserted further, it strikes against the driver 39 which is formed on the control slide 21 and engages in the guide groove 30, as a result of which the control slide 21 is pushed counter to the force of the tension spring 28, specifically until the data card 104 abuts against the tab 35, 36 or until the latch tip 105 of the locking latch 22 drops in in front of the latching tooth 72 formed on the control slide 21. Directly before the data card 104 has reached the read/write position as a result of the activation of the locking latch 22, the closing element 23 has been pivoted by means of the connecting part 24, and the bolts 62, 63 have been lowered behind the inserted data card 104. The reaching of the read/write position, in other words the correct functioning position of the data card 104 can be monitored, for example, by means of a photoelectric barrier assigned to the locking latch 22. The outputting of the data card 104 is triggered by activating a pushbutton key and is carried out by pivoting the locking latch 22 by virtue of the fact that a preferably motor-activated release element engages on the finger 27. After the control slide 21 has been released by the locking latch 22, the tension spring 28 guides the control slide 21 back into the initial position predefined by the connecting part 24. In the process, the bolts 62, 63 are raised directly after the release, under the control of the connecting part 24. At the same time as the control slide 21 is guided back, the data card 104 is pushed into the release position, the pressing-on limbs 85, 86 of the retaining spring 83 performing a braking function. If the data card 104 is removed, the closing element 23 also pivots, under the effect of the retaining spring 83, back into the initial position, also determined by the connecting part 24, in which position the bolts 62, 63 engage in the plane of movement of the data cards 104, as shown by FIG. 4.

I claim:

1. Receptacle for data cards having a cardholder in which the data cards are guided, and having locking means which are assigned to the cardholder and which are actuatable by means of a data card when the data card is inserted into the receptacle, and having ejection means for moving a data card located in a read-write position into a removal position, wherein the cardholder (20) and a control slide (21) mounted thereon are embodied in such that the control slide (21) is displaceable relative to the cardholder (20), counter to effect of a tension spring (28) by means of an insertable data card (104), wherein a locking latch (22) which is assigned to the control slide (21) is mounted in a sprung fashion on the cardholder (20) and embodied such that it is activatable with effect of unlocking the control slide (21), wherein a closing element (23) which is pivotal about an axis arranged transversely with respect to direction of movement of the data cards (104) is provided, said closing element (23), on one hand, interacts with a connecting part (24) formed in the control slide (21) and, on other hand, has at least one bar (62 or 63) which engages in a plane of movement of the data cards (104), wherein a retaining spring (83) which acts with effect of closing the cardholder (20) is assigned to the closing element (23), wherein when a data card (104) is inserted, the closing element (23) is pivotable counter to the effect of the retaining spring (83) by means of the data card (104), and wherein the connecting part (24) of the control slide (21) is embodied in such that the closing element (23) is locked if there is a data card (104) in the cardholder (20).

2. Receptacle according to claim 1, wherein the cardholder (20) is made of sheet metal as a punched and bent part.

3. Receptacle according to claim 1, wherein a surface (97 or 98) which is inclined with respect to the plane of movement of the data cards (104) is formed on the closing element (23), preferably on the bar (62 or 63).

4. Receptacle according to claim 1, wherein tongue-slot connections are provided between the control slide (21) and the cardholder (20), tongues (40, 41, 42, 43) which are formed on the ridges (33, 34) being bent and guide slots (44, 45) which are assigned to the tongues (40, 41, 42, 43) and are provided in the control slide (21) being formed as key holes.

5. Receptacle according to claim 1, wherein the connecting part (24) which is in the control slide (21) is such that when a data card (104) is inserted into the cardholder (20) the closing element (23) pivots out of closed position and guide plane of the cardholder (20) is cleared, and as the control slide (21) is displaced further by means of the data card (104), the closing element (23) is held in a pivoted position, and in an end position of the data card (104) the closing element (23) is automatically moved back into the closed position and so locked against pivoting.

6. Receptacle according to claim 1, wherein the closing element (23) is formed as a bridge (75) which is mounted on two sides in the cardholder (20).

7. Receptacle according to claim 6, wherein the retaining spring (83) is a leaf spring, wherein the retaining spring (83) is attached to the closing element (23), and wherein at least one pressing-on limb (85, 86), performing spring function, of the retaining spring (83) is such that, when the closing element (23) is mounted in the cardholder (20), the pressing-on limb (85, 86) has a sprung operative connection to a base element (32) of the cardholder (20) or of an inserted data card (104).

8. Receptacle according to claim 7, wherein the retaining spring (83) is connected in a positively locking fashion to the closing element (23) by hooks/eyelets and supporting and plug-in connecting means (89, 90/87, 88 and 91, 92).

9. Receptacle according to claim 6, wherein two said bars (62, 63) are formed on the closing element (23), preferably at a greatest possible distance apart.

10. Receptacle according to claim 9, wherein the bars (62, 63) and a base element (32) of the cardholder (20) are assigned to one another such that free punches (64, 65) are formed in the base element (32) for the bars (62, 63) to dip into the plane of movement of the data cards (104), and wherein the base element (32) is also provided with a recess (61) which engages in the base element (32) behind a locking plane of the bars (62, 63), in the direction of movement of a data card (104) to be inserted.

11. Receptacle according to claim 1, wherein the cardholder (20) is constructed in one piece, ridges (33, 34) being formed on a flat base element (32) in parallel such that guide grooves (30, 31) corresponding to the data cards (104) are formed between a base element (32) and the ridges (33, 34).

12. Receptacle according to claim 11, wherein the guide grooves (30, 31) are widened at an end in the direction of movement of the data cards (104).

13. Receptacle according to claim 11, wherein means for supporting the control slide (21), the locking latch (22) and the closing element (23) and means for attaching the cardholder (20) at an installation location are formed directly onto the cardholder (20).

14. Receptacle according to claim 13, wherein platforms (47, 48, 49, 50) are formed, as the means for attaching the cardholder (20), at the installation location on the ridges (33, 34) and at least two centering pins (51, 52, 53, 54) and threaded holes (55, 56, 57, 58) are formed on said platforms (47, 48, 49, 50).

15. Receptacle according to claim 13, wherein a bearing axle (59, 60) assigned to the locking latch (22) is formed directly on the cardholder (20), and wherein a retaining element (71) which is formed as a finger on the control slide (21) is provided for axially securing the locking latch (22).

* * * * *